March 15, 1966     P. A. SANDSTROM     3,241,111

MOTOR FIELD FRAME AND METHOD OF ASSEMBLY

Original Filed Nov. 10, 1960     2 Sheets-Sheet 1

INVENTOR.
PAUL A. SANDSTROM
BY Roger W. Jensen
ATTORNEY

March 15, 1966   P. A. SANDSTROM   3,241,111
MOTOR FIELD FRAME AND METHOD OF ASSEMBLY
Original Filed Nov. 10, 1960   2 Sheets-Sheet 2

*INVENTOR.*
PAUL A. SANDSTROM
BY Roger W. Jensen
ATTORNEY

United States Patent Office 3,241,111
Patented Mar. 15, 1966

3,241,111
MOTOR FIELD FRAME AND METHOD
OF ASSEMBLY
Paul A. Sandstrom, Minneapolis, Minn., assignor to Honeywell Inc., a corporation of Delaware
Continuation of application Ser. No. 68,470, Nov. 10, 1960. This application Dec. 8, 1964, Ser. No. 419,269
10 Claims. (Cl. 310—42)

This invention pertains in general to inductive devices such as motors, and more specifically to miniature inductive devices, and methods of fabrication thereof. This is a continuation of my co-pending application Serial No. 68,470, filed November 10, 1960, for Control Apparatus.

The lack of winding space has long been a problem in the manufacture of miniature inductive devices such as miniature inductive motors. That is, it is very difficult to provide space for sufficient turns of wire in the windings to produce the required torque or field without making the motor or inductive device too large for the application. It can be seen that, in the conventional motors where either the rotor or stator or both have a magnetic core with a number of radially projecting poles, the number of turns of wire wound on these poles is strictly limited. In order to increase the number of turns of wire the length of the poles must be increased and any increase in the length of the poles greatly increases the size, especially the diameter, of the device.

So that all of the available space may be utilized the windings are generally wound directly onto the core of the device. This can be a very difficult and tedious task, especially in miniature motors. Also, since any shorted turns make the whole device useless there is much loss of time and money in the winding procedure.

The present invention is concerned with solving the problems of lack of copper space and difficulty and cost in fabrication of miniature motors and inductive devices. This is done by a very unique method of bending the core to allow the windings to be placed in the motor parallel to, but spaced from the axis of rotation of the shaft. Because of this placement of the windings there is ample copper space and prewound coils can be used to simplify construction. By using prewound coils small sizes of wire can be used. Small wire cannot be used in coils wound on a motor directly because the wires must be forced into place and the small wires would break or short. The impedance of the motor can be greatly increased by the use of more turns of smaller wire thus giving a higher voltage miniature motor. Also because of this unique bending of the core, components having low physical tolerance can be used, as will be shown later.

In the present invention a bobbin or nonmagnetic form preferably a light plastic material, is made by some means such as molding. The method of making the bobbin or the material from which it is made does not affect the invention and is not meant to limit it in any way. The bobbin consists of a central axle and at least two circular slotted end portions. The end portions may be an integral part of the axle or they may be fitted on separately. These end portions are so placed that one is flush with one end of the central axle and the other is a slight distance in from the other end of the axle. The laminations are stacked on this other or protruding end of the axle and form the magnetic core for the device.

A core, which in this preferred embodiment is made up of a number of laminations of some magnetic material such as soft nickel-iron and each of which has a plurality of spokes radiating outward from a central axis in the form of a central yoke, is then put on the hub of the bobbin. A winding, which is prewound and tested, is placed over each spoke of the core and the spokes are bent approximately 90° so as to fit through the slots of both end portions of the bobbin. The coils are positioned on the spokes so that after the first bending, the coils are located between the end portions of the bobbin. Each spoke is then bent again near the end thereof approximately 90° so they all point radially inward toward a central axis. Thus each spoke is now in a U shape with one leg of the U connected to all of the other spokes by a central yoke. The central portion of the U, or the axial portion, has a winding around it. The other leg of the U which each spoke describes points inward and all of these other legs converge to form an air gap between their ends.

This total assembly is then potted and a central aperture is bored in it axially through the air gap formed by the ends of the spokes and through the central yoke of the core or in other words the axle of the bobbin is bored out. A bore plug is then mounted in this aperture. This boreplug consists of a cylindrical sleeve-like container having a shaft running longitudinally through it and suitable anti-friction bearings at either end upon which the shaft rotates. The outer diameter of the container is slightly smaller than the inner diameter of the bored aperture in the core and winding assembly. A rotor is mounted on one end of the shaft and positioned so as to rotate in the air gap formed by the ends of the spokes.

The present invention has overcome the limits on copper space that restrict prior art devices, by placing coils in the device longitudinally, or parallel to and spaced from the rotating shaft. Thus if more turns are desired the spokes of the core can be made longer and the prewound coils can be made slightly longer. When the device is assembled the U, formed in the spokes by bending, will have a slightly longer central portion. It can be seen that many turns can be added to each winding and only a slight increase in the length of the device will occur.

The present invention eliminates many production problems by having very simple parts and assembly procedure. Also, because of the abundance of copper space prewound coils can be used and these can be tested before the motor is assembled. Thus costs are drastically reduced because of fewer discarded parts and wasted labor.

An object of this invention is to provide an improved miniature inductive device.

Another object of this invention is to provide a simpler and cheaper miniature inductive motor.

Another object of this invention is to provide a high voltage miniature inductive motor.

Another object of this invention is to provide an improved method for fabricating a miniature motor or inductive device.

Still another object of this invention is to provide a simpler and cheaper method for fabricating a miniature motor or inductive device.

These and other objects will become more apparent from a reading of the specification and appended claims in conjunction with the drawings in which:

Figure 1:
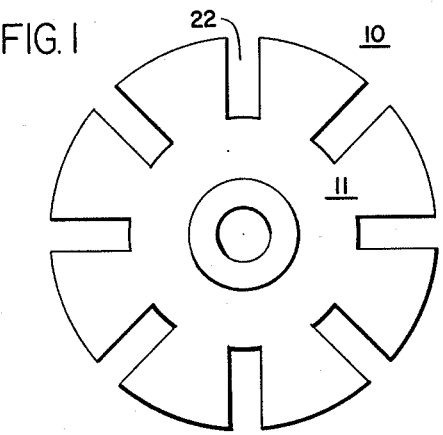
FIGURE 1 is an end view of one end of the nonmagnetic bobbin.
Figure 2:
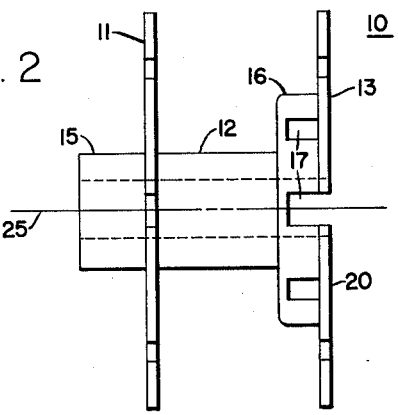
FIGURE 2 is a side view of the nonmagnetic bobbin.
Figure 3:
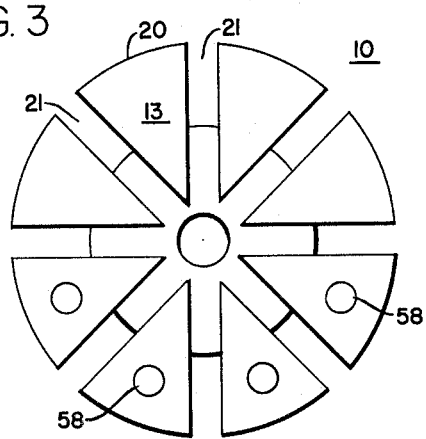
FIGURE 3 is an end view of the other end of the nonmagnetic bobbin.
Figure 10:
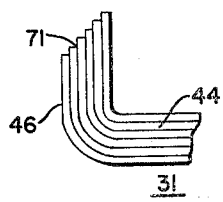
Figure 11:
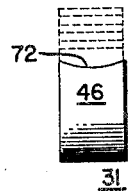

FIGURE 10 depicts the end portion of a pole of the core after bending the core; and FIGURE 11 depicts the end portion of the pole of the core after bending and after boring an aperture for a rotor, Referring to FIGURES 1, 2, and 3, the nonmagnetic bobbin 10 can be seen to have an end portion 11, an axle portion 12 and another end portion 13. These portions may be one integral part formed by molding a plastic material or they may be separate parts assembled and held in place by some suitable means such as by adhesive means or some equivalent arrangement. The means of bobbin construction is not critical to this invention and will not be further elaborated on. End portion 11 is a flat circular disk shaped member having a plurality of equiangularly located radially extending slots 22 therein, and is positioned on axle 12 far enough to leave a projecting hub 15. End portion 13 has a central cylindrical portion 16 of greater diameter than axle 12. Cylindrical portion 16 has a plurality of equiangularly arranged axially extending slots 17 therein. A plurality of wedge shaped portions 20 are provided and are positioned on the axial end of cylindrical portion 16 so as to leave slots 21 between adjacent wedge shaped portions 20, and so that slots 21 and slots 17 are aligned radially. Generally the number of slots 17 and 21 will equal the number of slots 22. The cylindrical portion 16 is connected to the axle 12 on one end and is either integral with or is connected by suitable means to wedge shaped portions 20 at the other end. This manner of construction is preferred because, as will later be seen, the ends of the core are extended through slots 21 and bend down into slots 17. Thus, the core rests on cylindrical portion 16 and is held from moving radially inward or rotationally. Also slots 21 insure a symmetrical convergence of the ends of the spokes. End portion 13 is so placed on axle 12 that the slots 17 and 21 are aligned along axis 25 with slots 22 of end portion 11.

Figure 4:
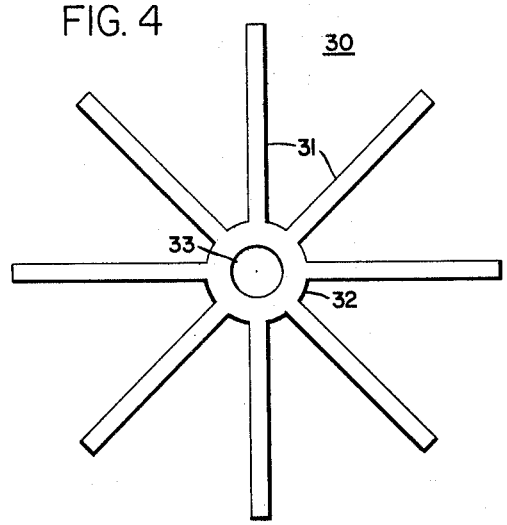
FIGURE 4 is an end view of the core before assembly.

FIGURE 4 depicts a magnetic core 30, which, for convenience, has been drawn half size. In this preferred embodiment core 30 has 8 spokes 31 radiating from a central yoke portion 32. There may, however, be more or less spokes depending upon the number of poles desired in the device. Yoke portion 32 has a centrally located hole 33 for mounting purposes. A number of laminations, each of which looks exactly like FIGURE 4, are stacked with the spokes 31 thereof in register to form core 30. The width or axial thickness of the core will be approximately the axial length of hub 15 on bobbin 10; it could, however, be much narrower or much wider axially as desired.

Figure 5:
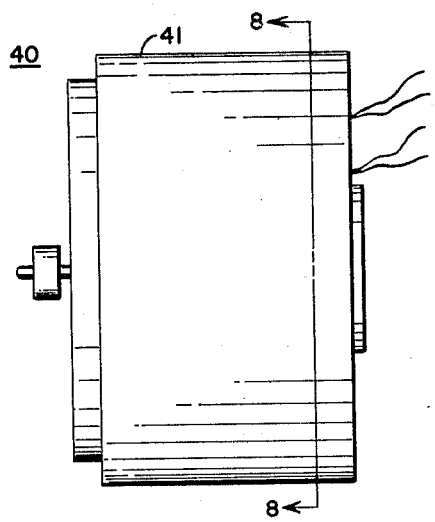
FIGURE 5 is a side view of the assembled motor.

FIGURE 5 depicts a side view of a completely assembled motor 40. The motor includes an outer case 41 which may be made out of some suitable metal for magnetic and physical protection or it may be just a potting compound covering the windings.

Figure 6:
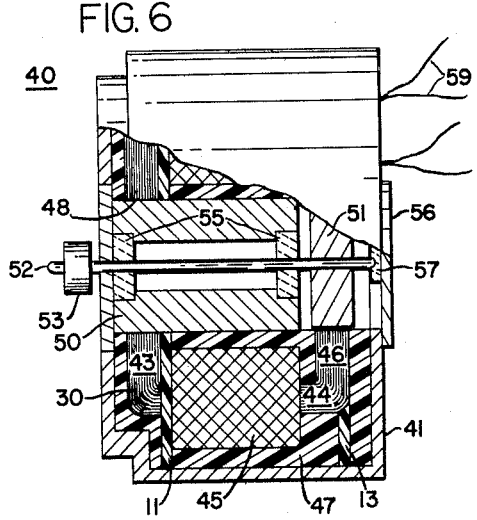
FIGURE 6 is a partial cut-away view of FIGURE 5.

FIGURE 6 is a partial cut-away view of assembled motor 40. Core 30 can be seen with a right angle bend at end portion 11 of bobbin 10 and another right angle bend at end portion 13 of bobbin 10. Thus each spoke 31 of core 30 has a U-shaped configuration, with one leg 43 of each of the U's described by each of the spokes 31, connected to all of the other legs 43 by yoke portion 32. The central or axial portion 44 of the U described by each spoke 31 of core 30 has a winding 45 around it, and the other legs 46 of the U's described by each of the spokes 31 of core 30 converge to form an air gap.

Once the windings 45 are placed on the spokes 31 of core 30 and the spokes 31 bent about bobbin 10, as described above, the total assembly is inserted in case 41 and potted. The potting compound is identified by reference numeral 47. A central hole or aperture 48 is then bored axially through the assembly. Aperture 48 is, for convenience, approximately the same diameter as hole 33 in core 30. Thus, when aperture 48 is bored substantially all of axle 12 of bobbin 10 is removed giving maximum space for a rotor and minimum air gap between rotor and core.

Figure 7:
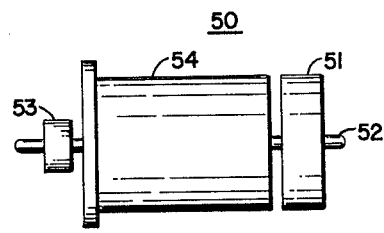
FIGURE 7 is a side view of the rotor assembly or boreplug.

After the boring process a bore-plug 50 is inserted into aperture 48. Bore-plug 50 is depicted in FIGURE 7. It includes a circular rotor 51 mounted on one end of a shaft 52 having a suitable pinion gear 53 mounted on the other end thereof. Gear 53 represents one possible method of transferring the torque from this device to the load and in no way limits the invention. Shaft 52 extends through a cylindrical shaped case 54 forming the main body of the bore-plug 50 and containing suitable anti-friction bearings in which shaft 52 rotates. These anti-friction bearings are shown in FIGURE 6 and are identified by reference numeral 55. It can be seen in FIGURE 6 that rotor 51 is so positioned on shaft 52 that it rotates within the air gap defined by the ends of core spokes 31. A circular end plate 56 is provided and is centrally abutted against one end of housing 41 so as to close off one end of aperture 48. End plate 56 restricts the axial movement of shaft 52 and it may contain a jeweled thrust bearing 57 for shaft 52 to rotate in or the shaft may simply butt against the plate 56. Suitable means may be provided if desired to prevent axial shifting of shaft 52 to the left as shown in FIGURE 6. This means could be the anti-friction bearings 55 or could be a separate thrust bearing, not shown.

Figure 8:
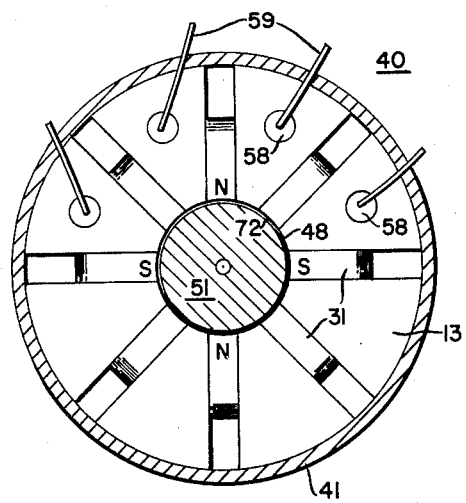
FIGURE 8 is a cross sectional view of FIGURE 5 taken along section lines 8—8.

FIGURE 8 is a cross-sectional view of FIGURE 5 showing the rotor 51 in the bored aperture 48. It can be seen in this view that the boring process will leave a circular air gap between the ends of spokes 31 of core 30. Stated otherwise, the ends of the spokes terminate in arcuate pole faces which collectively define a circular rotor opening. Construction is greatly simplified because there is only one machine process to make the ends of the spokes 31 conform with the circular rotor 51. This can be seen more clearly in FIGURES 10 and 11. FIGURE 10 shows an end portion of spoke 31 of core 30 after core 30 is bent around bobbin 10. It can be seen that the U described by each of the succeeding laminations will be slightly larger than the last one. Thus, a stepped effect identified by reference numeral 71 in FIGURE 10 will be created at the end of portion 46 of the U, formed by bending spoke 31. As previously explained, the assembled bobbin 10, core 30 and windings 45 are put into the case 41 and potted. A central aperture 48 is then bored longitudinally through the assembly. This boring process cuts off the stepped end 71 of portion 46 of each of the spokes 31 forming an arcuate pole face numerically designated 72 and shown in FIGURE 8. An enlarged top view of this end portion 46 is depicted in FIGURE 11 illustrating the arcuate pole face 72. The stepped end portion 71 is shown dotted in FIGURE 11 to illustrate substantially the amount that is cut off. One machining process cuts the spokes 31 to the proper length and shapes the ends into the desired arcuate shape 72. Thus it should be noted that none of the tolerances of the laminations are critical since both the length of the spokes 31 and the hole 33 will be bored to the correct size and shape before bore-plug 50 is inserted. A plurality of holes 58 have been provided in end portion 13 of bobbin 10. Leads 59, which are connections for winding 45, extend through these holes 58 for purposes of externally exciting windings 45.

Figure 9:
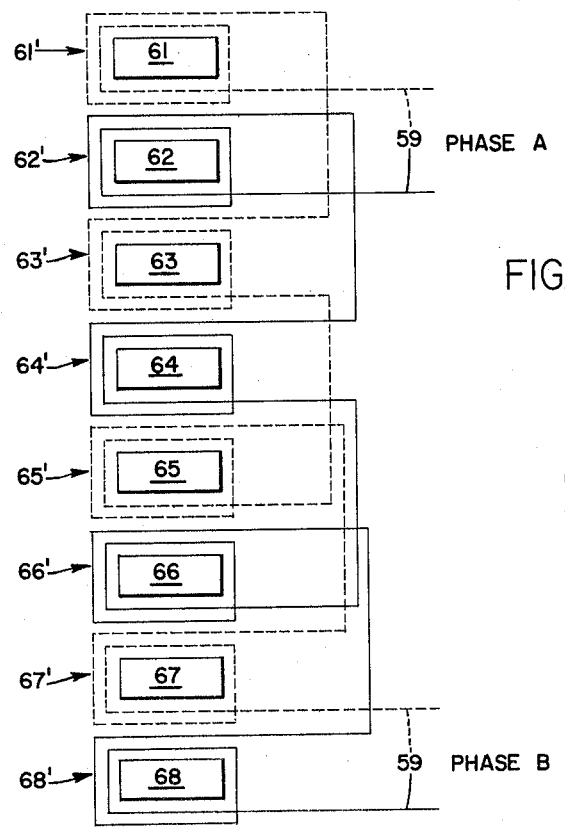
FIGURE 9 is a schematic wiring diagram.

FIGURE 9 is a schematic wiring diagram of an 8 pole motor. In this schematic diagram the individual spokes 31 have been separately numbered 61 through 68 for purposes of explanation only. Each of the spokes 61–68 is encircled by a winding 45 which in the figure are identified by reference numbers 61′ through 68′ respectively. Each winding is the same and it is only by their connection in the circuit that they differ. In this preferred embodiment the motor 40 is energized by a two phase power supply having phases A and B. The windings with the dotted leads 61′, 63′, 65′, and 67′ indicate windings that are energized with one phase, phase A, and the windings with the solid leads 62', 64', 66', and 68', indicate windings that are energized with the other phase, phase B. Also it can be seen in FIGURE 9 that adjacent windings (61 and 63 for example) of a similar phase are oppositely wound, thus giving a sequence of north and south poles adjacent to each other in any one phase.

The operation of this motor is similar to any conventional rotating electromagnetic field type of motor. In FIGURE 8 the north and south poles of only one phase have been shown for convenience. The configuration chosen is only an example and is not meant to limit the invention in any way. The flux path is from the north poles at the arcuate ends or pole faces of two spokes 31, across the air gap, through the rotor 51, across the air gap, into the south poles at the pole faces of the other two spokes 31, and along these two spokes 31 to the yoke portion 32. It then goes through the yoke portion 32 to the first two spokes 31 of core 30 and thence to the north poles thereof for a complete path. The same procedure can be followed for the other phase. The two phases, when energized, cause a rotating field which causes rotor 51 to rotate in the conventional manner. It will be understood that rotor 51 may be of any suitable type such as squirrel cage, hysteresis, eddy current, etc.

It can be seen that this invention greatly simplifies the construction of miniature electric motors or similar inductive devices, while at the same time it greatly increases the available winding or copper space. By increasing the length of spokes 31 of core 30 the bight of the U which the spokes describe after being bent can be lengthened axially and the windings 45 can be lengthened axially. Thus a small increase in longitudinal length of the motor greatly increases the available copper space. Prewound windings can be used to greatly simplify construction, and to allow the use of a small size of wire thus raising the impedance of the motor and making it a high voltage device. Because of the simplicity of parts, the elimination of close tolerances and ease of construction the cost can also be greatly reduced.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. A motor frame comprising in combination:
    a magnetic core having a central hub and a plurality of coil supporting members extending spoke-like therefrom and adapted to slidably receive a like plurality of prewound coils, said coil supporting members being of substantially constant cross-section along the entire length thereof and formed to extend radially outwardly of said hub for a predetermined distance, axially therefrom for a predetermined distance, and radially inwardly to form at the ends thereof a plurality of air gaps intermediate the ends thereof; and
    a prewound coil disposed on the axially extending portions of each of said coil supporting members on said core.

2. The apparatus of claim 1 in combination with a rotor means rotatably supported on said frame in magnetic energy transferring relationship with said radially inwardly extending ends of said members.

3. The apparatus of claim 1 in which the magnetic core is comprised of a plurality of identically shaped laminations, the ends of said laminated coil supporting members being bored out after formation of said core to terminate in arcuate pole faces that collectively define a circular rotor opening.

4. An inductive device comprising:
    a nonmagnetic bobbin, said bobbin comprising a central axle and at least two end portions, the first of said end portions being fitted on one end of said axle sufficiently far to leave a hub and the second of said end portions being fitted on said axle approximately flush with the other end of said axle;
    a plurality of prewound windings; and
    a magnetic core having spokes of substantially constant cross-section radiating from a central yoke portion, said yoke portion being mounted on said hub adjacent said first end portion, said windings being fitted over said spokes, and said spokes being bent about said first end portion and said second end portion so as to form an air gap between the ends thereof adjacent said second end portion.

5. An inductive device comprising:
    a nonmagnetic bobbin, said bobbin comprising a central axle and at least two end portions, one of said end portions being fitted on one end of said axle sufficiently far to leave a hub and the other of said end portions being fitted on said axle approximately flush with the other end of said axle, a plurality of prewound windings; and
    a plurality of laminations having spokes radiating from a central axis stacked on the hub of said bobbin to form a magnetic core, said windings being fitted over said spokes, and said spokes being of substantially constant cross-section and being bent about said end portions so as to form an air gap between the ends thereof.

6. The method of constructing inductive apparatus which comprise the steps of:
    fabricating a core of magnetic material in the shape of a flat hub with a plurality of substantially constant cross-section spokes extending radially therefrom;
    winding a plurality of coil windings with a central aperture substantially the same size as the cross-section of said spokes;
    providing a bobbin with an axially disposed hub and circular, slotted end portions;
    mounting the hub of the core on the hub of the bobbin;
    sliding the coils on the radially extending spokes of said core; and
    bending the spokes of said core through the slots of the circular end portions of the bobbin so that the ends of the spokes are disposed radially inwardly of the bobbin and are positioned concentrically of the axis of the bobbin.

7. The method of claim 6 and the additional steps of potting the core, windings, and bobbin and boring an axially disposed opening in the area encompassed by the ends of the spokes.

8. The method of constructing inductive apparatus of the class above described which comprises the steps of:
    fabricating a core of magnetic material in the shape of flat circular hub with a plurality of substantially constant cross-sectional area spokes extending radially therefrom;
    winding a plurality of coils with a central aperture substantially the same size as the cross-sectional area of said spokes;
    slidably disposing one of said coils on each of said spokes; and
    bending said spokes on each end of said coils so that the end extremities of said spokes are disposed concentrically of the axis of the hub of said core.

9. The method of constructing inductive apparatus of the class above described which comprises the steps of:
    fabricating a core of magnetic material in the shape of a flat circular hub with a plurality of substantially constant cross-sectional area spokes extending radially therefrom;
    providing a rotor journalling support;
    attaching the rotor journalling support to the hub of the core;

winding a plurality of coil windings with a central aperture substantially the same size as the cross-sectional area of said spokes;

slidably disposing one of said coils on each of said spokes; and bending said spokes on each end of said coils so that the end extremities of said spokes are disposed concentrically of the axis of the hub of said core.

10. The method of claim 9 and the additional steps of providing a magnetic energy responsive rotor and disposing the rotor in the rotor journalling support in magnetic energy transferring relationship with the end extremities of the coils.

References Cited by the Examiner

UNITED STATES PATENTS

| | | | |
|---|---|---|---|
| 2,484,001 | 10/1949 | Raymond | 310—254 |
| 2,487,180 | 11/1949 | Rawlings | 310—254 |
| 2,996,761 | 8/1961 | Hicks | 29—155.33 |
| 3,141,233 | 7/1964 | Schneider | 29—155.53 |
| 3,153,157 | 10/1964 | Rabe | |

FOREIGN PATENTS 243,001   3/1960   Australia.

MILTON O. HIRSHFIELD, *Primary Examiner.*

J. W. GIBBS, *Assistant Examiner.*